United States Patent
Yeh

(10) Patent No.: US 9,616,536 B2
(45) Date of Patent: Apr. 11, 2017

(54) COUNTERWEIGHT MECHANISM FOR SWIVEL ARRANGEMENT

(71) Applicant: Ming-Yueh Yeh, Taichung (TW)

(72) Inventor: Ming-Yueh Yeh, Taichung (TW)

(73) Assignee: KEN ICHI MACHINE CO., LTD., Taichung (TW)

( * ) Notice: Subject to any disclaimer, the term of this patent is extended or adjusted under 35 U.S.C. 154(b) by 175 days.

(21) Appl. No.: 14/566,743

(22) Filed: Dec. 11, 2014

(65) Prior Publication Data
US 2016/0167183 A1   Jun. 16, 2016

(51) Int. Cl.
B23Q 5/56   (2006.01)
B23Q 1/54   (2006.01)
B23Q 11/00   (2006.01)
B23C 1/14   (2006.01)

(52) U.S. Cl.
CPC ............ *B23Q 5/56* (2013.01); *B23Q 11/0021* (2013.01); *B23Q 11/0025* (2013.01); *B23Q 11/0032* (2013.01); *B23Q 11/0035* (2013.01); B23C 1/14 (2013.01); B23Q 1/5406 (2013.01); Y10T 16/84 (2015.01); Y10T 29/5109 (2015.01); Y10T 408/545 (2015.01); Y10T 409/30896 (2015.01); Y10T 409/304312 (2015.01); Y10T 409/309688 (2015.01)

(58) Field of Classification Search
CPC .................. B23Q 5/56; B23Q 11/0035; Y10T 409/305824; Y10T 409/30896; Y10T 409/309688; Y10T 409/304312; Y10T 408/545; Y10T 29/5109; Y10T 29/5114; Y10T 16/82; Y10T 16/84

USPC .................. 409/141, 168, 224, 237; 408/71; 188/378, 379, 380; 29/27 C, 27 R; 16/400, 401
See application file for complete search history.

(56) References Cited

U.S. PATENT DOCUMENTS

| | | | | |
|---|---|---|---|---|
| 3,218,933 A * | 11/1965 | Sedgwick | ............ | B23Q 1/5437 409/167 |
| 6,865,788 B2 * | 3/2005 | Pasquetto | ............ | B23Q 1/5437 269/57 |
| 2006/0185453 A1 * | 8/2006 | Miyazawa | ............... | B23Q 1/52 74/49 |
| 2007/0048101 A1 * | 3/2007 | Beteille | .................... | B23Q 1/52 409/168 |
| 2010/0176545 A1 * | 7/2010 | Yonenaga | ................. | B23Q 5/58 269/289 R |
| 2011/0023654 A1 * | 2/2011 | Tatsuda | .................... | B23Q 1/52 74/813 R |

FOREIGN PATENT DOCUMENTS

| JP | 04115841 A | * | 4/1992 |
|---|---|---|---|
| JP | 2001009653 A | * | 1/2001 |

* cited by examiner

*Primary Examiner* — Erica E Cadugan
*Assistant Examiner* — Michael Vitale

(57) ABSTRACT

A counterweight mechanism for a swivel arrangement includes first and second counterweights each including a seat, an axle, and two cylinders. The swivel arrangement has one end adjacent to the axle. The axle is rotatably, partially disposed in the seat. Each cylinder has a first end pivotably secured to a position proximate to the axle and a second end pivotably secured to the seat.

5 Claims, 5 Drawing Sheets

COUNTERWEIGHT MECHANISM FOR SWIVEL ARRANGEMENT

BACKGROUND OF THE INVENTION

1. Field of the Invention

The invention relates to counterweights and, more particularly, to a counterweight mechanism having two opposite counterweights mounted on both ends of a swivel arrangement.

2. Description of Related Art

Conventionally, a swivel arrangement is mounted to a lathe, a boring machine, a milling machine, or a machining center. After turning the swivel arrangement to a preset position, a motor is activated to output a rotational force. Thus, the swivel arrangement provides a balancing force to the machine in operation. The motor activates the swivel arrangement in a machining process. In addition to providing a balancing force to the machine by the swivel arrangement by operating the motor in the process of turning the swivel arrangement for machining, the motor further provides an opposite force to stop the swivel arrangement.

However, such operation can greatly increase load to the motor, can adversely increase wear of the transmission mechanism, and can shorten the useful life of components. Further, conventional swivel arrangements are not reliable, and products made by the machine in cooperation with the swivel arrangement are low in quality.

Thus, the need for improvement still exists.

SUMMARY OF THE INVENTION

It is therefore one object of the invention to provide a counterweight mechanism for a swivel arrangement comprising first and second counterweights each including a seat, an axle, and two cylinders. The swivel arrangement has one end adjacent to the axle. The axle is rotatably, partially disposed in the seat. Each of the cylinders have a first end pivotably secured to a position proximate to the axle and a second end pivotably secured to the seat.

The above and other objects, features and advantages of the invention will become apparent from the following detailed description taken with the accompanying drawings.

DETAILED DESCRIPTION OF THE INVENTION

Figure 1:
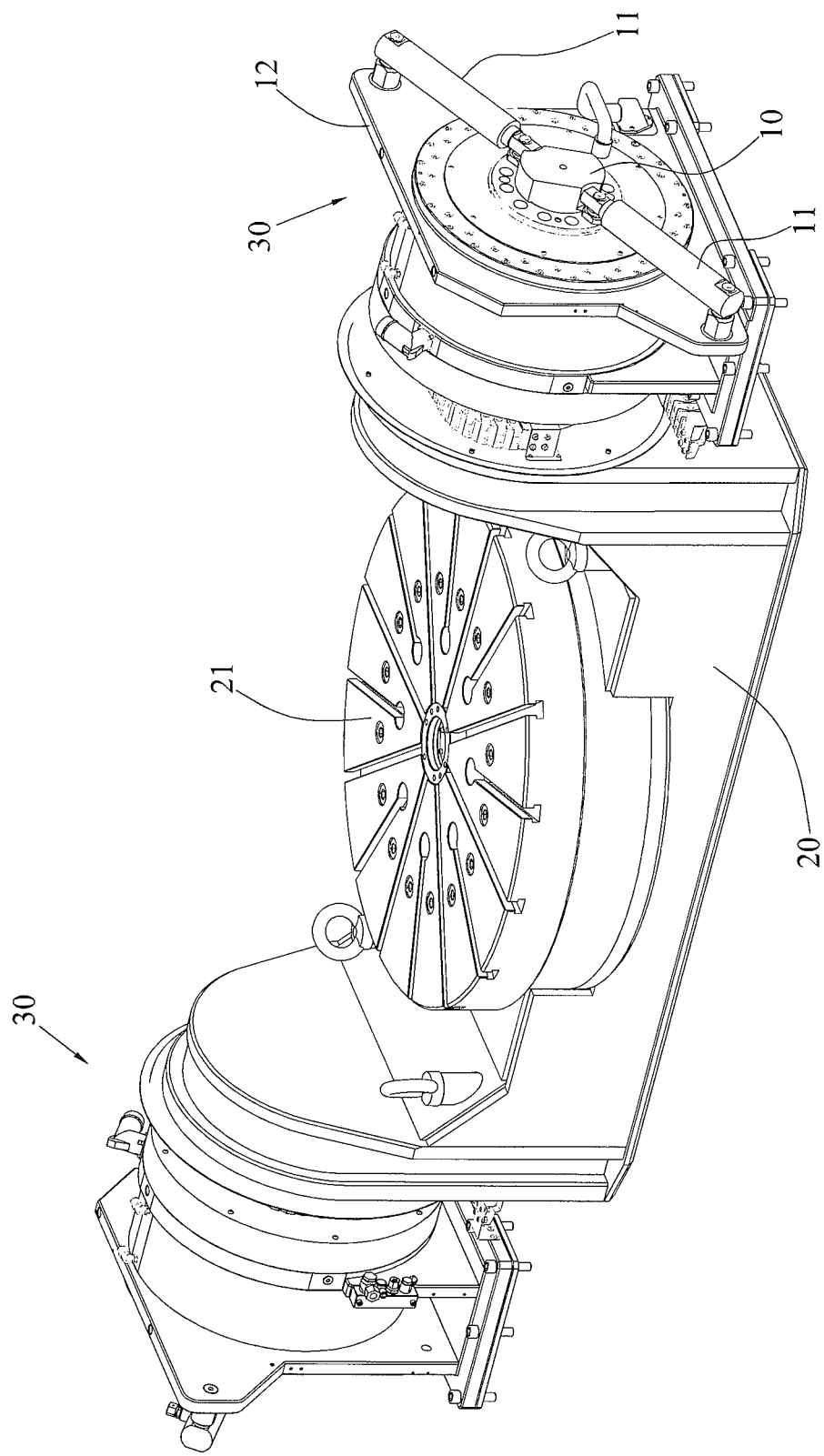
FIG. 1 is a perspective view of a counterweight mechanism mounted to a swivel arrangement according to the invention.
Figure 2:
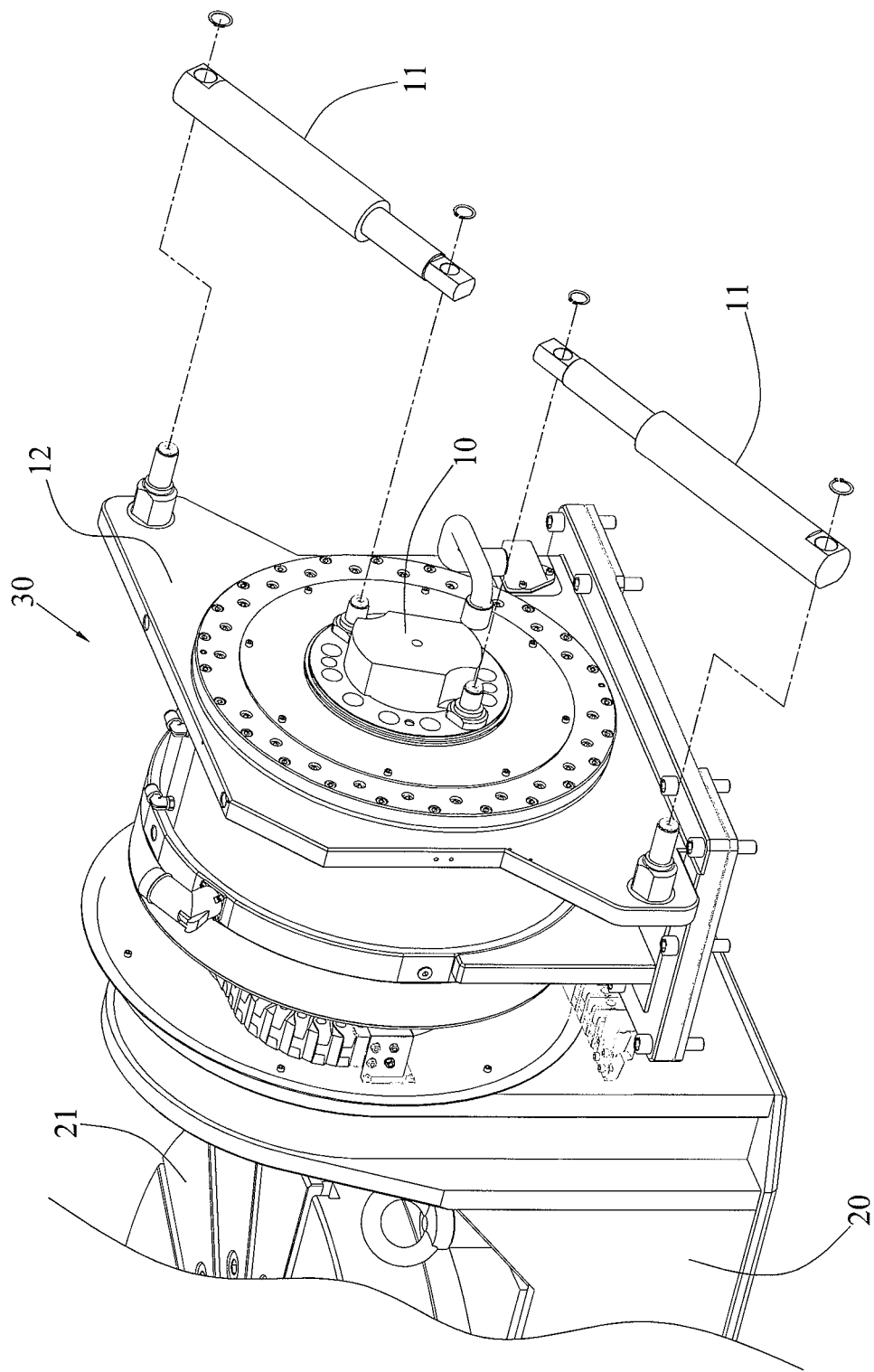
FIG. 2 is an exploded perspective view of one end of FIG. 1.
Figure 3:
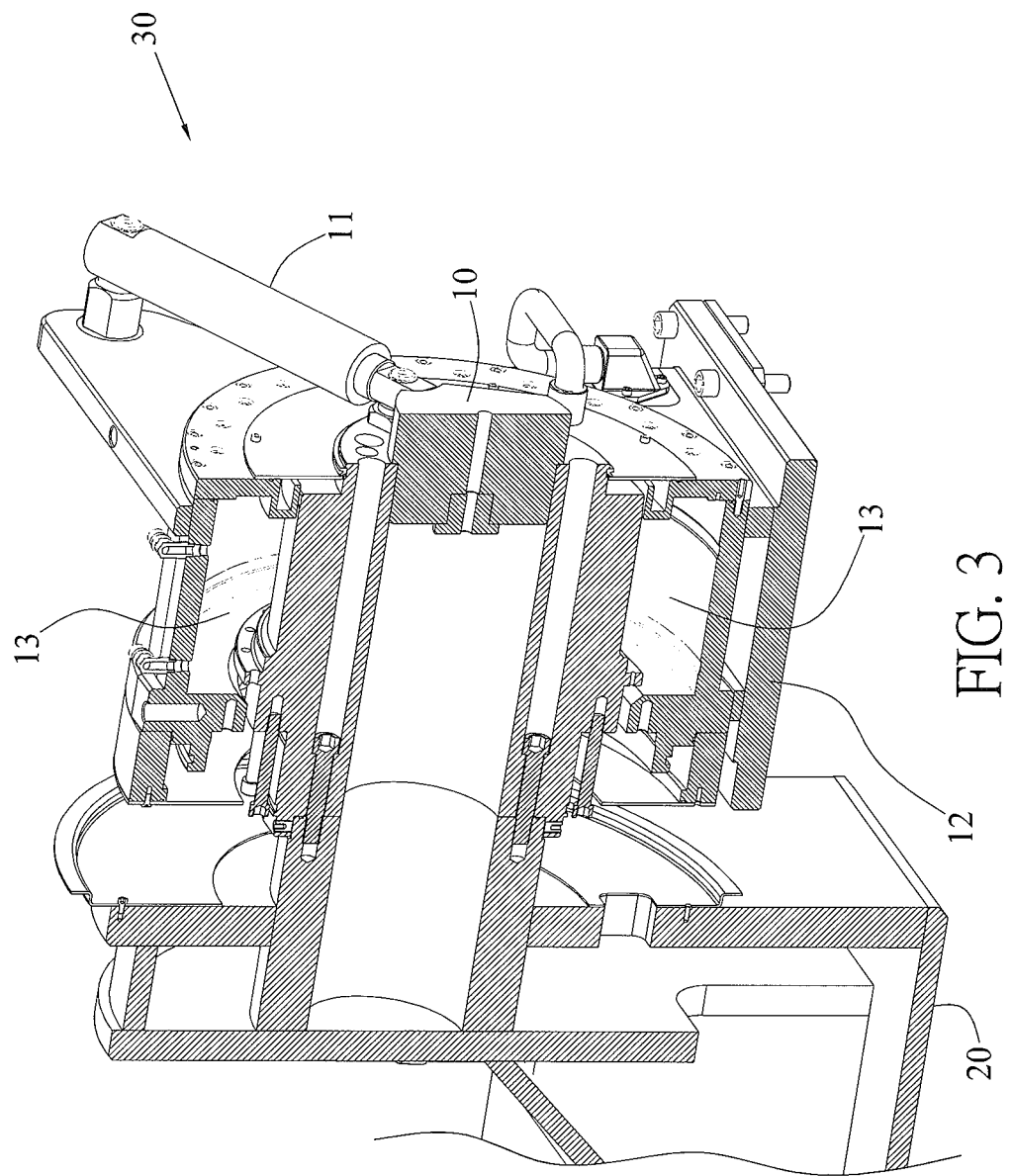
FIG. 3 is a longitudinal sectional view of one end of FIG. 1.
Figure 4:
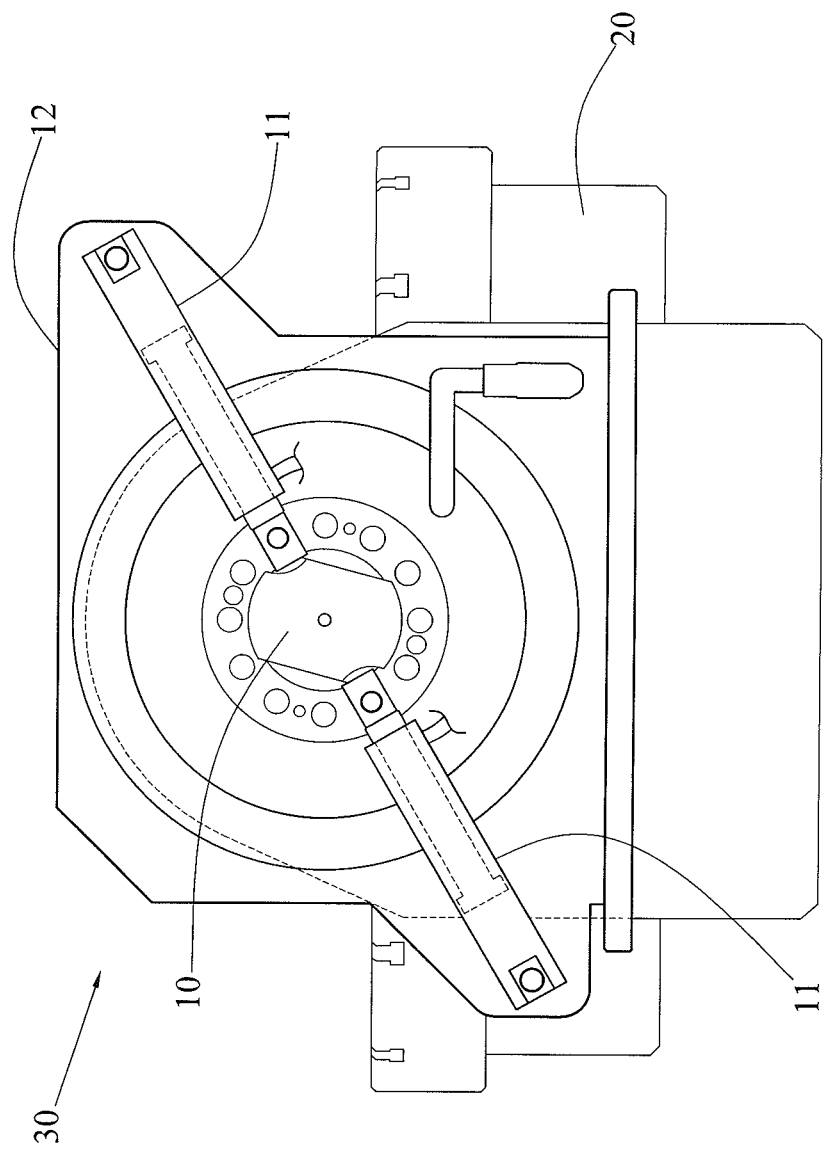
FIG. 4 is an elevational view of one end of FIG. 1.

Referring to FIGS. 1 to 5, a counterweight mechanism for a swivel arrangement 20 in accordance with the invention is discussed in detail below.

Two counterweights 30 are provided, and each counterweight 30 includes a seat 12, an axle 10, and two cylinders 11. The swivel arrangement 20 includes a platform 21 on a top. The swivel arrangement 20 has one end adjacent to the axle 10. The axle 10 is rotatably, partially disposed in the seat 12. A space 13 is formed between the axle 10 and the seat 12. Each of the opposite cylinders 11 has a first end pivotably secured to a position proximate to the axle 10 and a second end pivotably secured to the seat 12. Thus, the cylinders 11 and the axle 10 are aligned in an inoperative state.

The counterweights 30 are located at both ends of the swivel arrangement 20. A drive source (not shown) such as a torsional vibration motor provided in the space 13 can produce a rotary force without a speed reduction mechanism to reduce repair and maintenance costs. The cylinders 11 are either hydraulic cylinders or pneumatic cylinders.

In response to a clockwise rotation of the axle 10, the swivel arrangement 20 pivots counterclockwise a predetermined angle, each of the cylinders 11 pivot and extend, and the cylinders 11 become substantially parallel to each other due to the hydraulic or pneumatic nature thereof. Thereafter, each of the cylinders 11 pivot and retract, and the cylinders 11 become aligned with the axle 10 again. As a result, vibration and jarring generated by the pivotal movement of the swivel arrangement 20 are decreased to a minimum.

Figure 5:
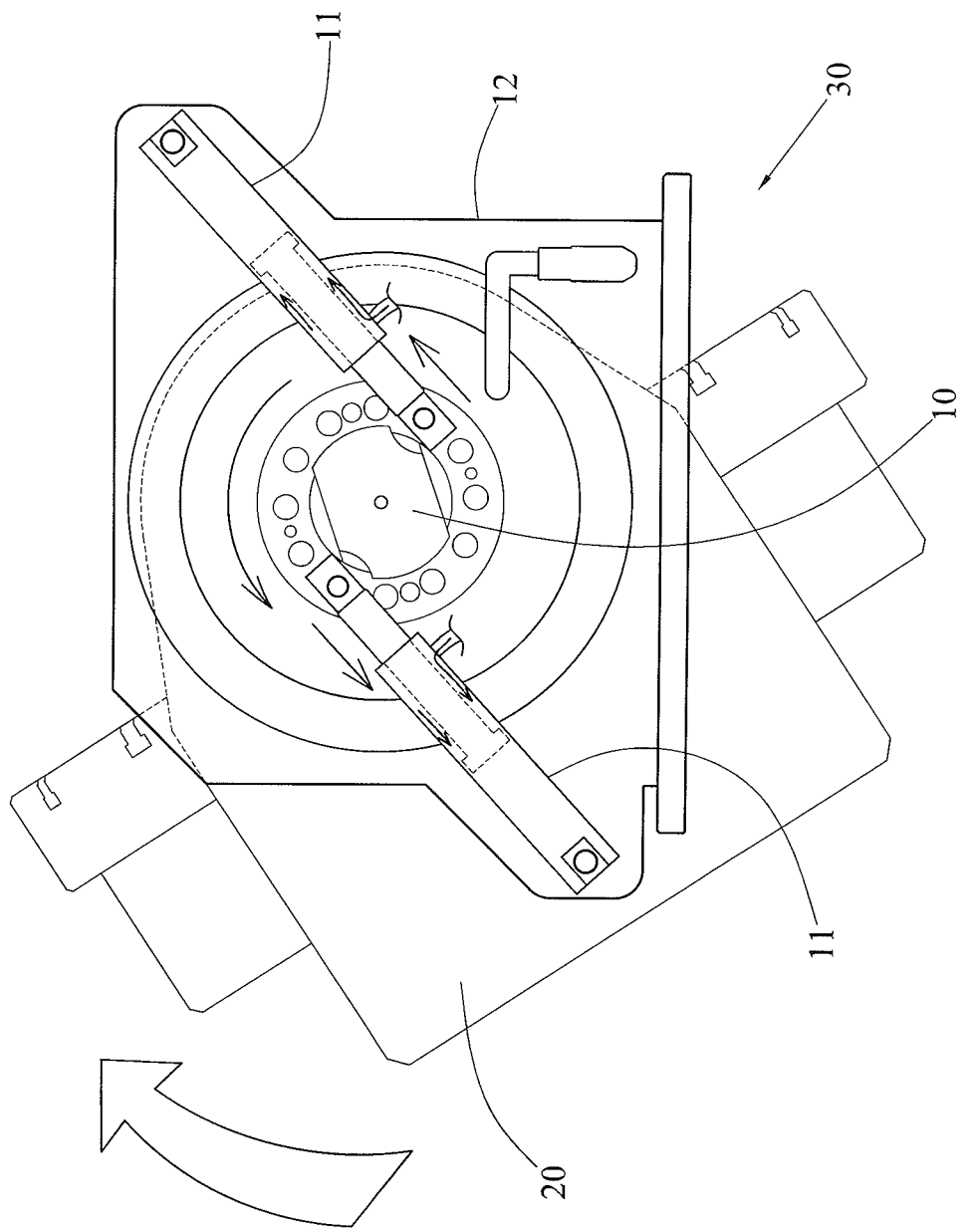
FIG. 5 is a view similar to FIG. 4 showing a clockwise rotation of the swivel arrangement and a counterclockwise rotation of one counterweight as a counterbalancing action.

As shown in FIG. 5, in response to a counterclockwise rotation of the axle 10, the swivel arrangement 20 pivots clockwise a predetermined angle, each of the cylinders 11 pivot and extend, and the cylinders 11 become substantially parallel to each other due to the hydraulic or pneumatic nature thereof. Thereafter, each of the cylinders 11 pivot and retract, and the cylinders 11 become aligned with the axle 10 again. As a result, vibration and jarring generated by the pivotal movement of the swivel arrangement 20 are decreased to a minimum.

It is envisaged by the invention that products made by a machine (e.g., lathe) in cooperation with the swivel arrangement 20 are high in quality. Further, the useful life of each of the machine, the drive source, and the swivel arrangement 20 is increased greatly.

While the invention has been described in terms of preferred embodiments, those skilled in the art will recognize that the invention can be practiced with modifications within the spirit and scope of the appended claims.

What is claimed is:

1. A counterweight mechanism for a swivel arrangement, which works in cooperation with a machine, the counterweight mechanism comprising:
   first and second counterweights each including a seat, an axle, and two cylinders;
   wherein in each of the first and second counterweights, the respective axle is rotatably disposed in the associated seat about a rotation axis; and
   wherein in each of the first and second counterweights, each of the respective two cylinders has a first end pivotably secured to the associated axle about a pivot axis that extends parallel to the rotation axis, and a second end pivotably secured to the associated seat, with the second ends of the respective two cylinders located diametrically opposite to each other relative to the rotation axis; and
   wherein in each of the first and second counterweights, the first and second ends of the respective two cylinders and the associated axle are all aligned with one another when the respective two cylinders are in a retracted state.

2. The counterweight mechanism for the swivel arrangement of claim 1, wherein the swivel arrangement is disposed between the first and second counterweights.

3. The counterweight mechanism for the swivel arrangement of claim 1, wherein the swivel arrangement includes a top platform.

4. The counterweight mechanism for the swivel arrangement of claim 1, with each of the first and second counterweights further comprising a respective space formed between the associated axle and the associated seat.

5. The counterweight mechanism for the swivel arrangement of claim 1, wherein the machine is a lathe.

\* \* \* \* \*